United States Patent [19]

Hsu

[11] Patent Number: 5,031,155
[45] Date of Patent: Jul. 9, 1991

[54] COMPRESSION AND RECONSTRUCTION OF SONIC DATA

[75] Inventor: Kai Hsu, Danbury, Conn.

[73] Assignee: Schlumberger Technology Corporation, New York, N.Y.

[21] Appl. No.: 526,418

[22] Filed: May 21, 1990

Related U.S. Application Data

[62] Division of Ser. No. 345,510, Apr. 28, 1989, Pat. No. 4,951,266.

[51] Int. Cl.$^5$ .............................................. G01V 1/40
[52] U.S. Cl. ...................................... 367/25; 364/422
[58] Field of Search .................. 364/421, 422; 367/38, 367/59, 25, 74

[56] References Cited

U.S. PATENT DOCUMENTS 4,509,150  4/1985  Davis ..................................... 367/76

OTHER PUBLICATIONS

Andrews, H. C. et al., "Outer Product Expansions and Their Uses in Digital Image Processing", IEEE Transactions on Computers, vol. C-25, pp. 140-148 (Feb. 1976).

Gerbrands, J. J., "On the Relationships Between SVD, KLT, and PCA", Pattern Recognition, vol. 14, Nos. 1-6, pp. 375-381 (1981).

Kramer, H. P. et al., "A Linear Coding for Transmitting a Set of Correlated Signals", IRE Trans. Inform. Theory, vol. 2, pp. 41-46 (1956).

Cliet, C. et al., "Pattern Recognition: An Application to Wave Separation in Three-Component Offset VSP", Presented at the 56th Annula Mtg. of Soc. of Exploration, Geophysics, Houston, pp. 308-310 (1986).

Done, W. J. et al., "Coherent Noise Suppression in Seismic Data Using Eigenvalue/Eigenvector Decomposition", Proc. of 1988 Intern. Conf. Acoust. Speech, Signal Processing, pp. 908-911 (1988).

Freire, S. L. M. et al., "Application of Singular Value Decomposition to Vertical Seismic Profiling", Geophysics, vol. 53, No. 6, pp. 778-785 (Jun. 1988).

Hemon, C. H. et al., "Use of the Karhunen-Loeve Transformation in Seismic Data Processing", Geophysical Prospecting, vol. 26, 1978, pp. 600-606 (1978).

Jones, I. F., "Applications of the Karhunen-Loeve Transform in Reflection Seismology", Ph.D. Thesis, Univ. of British Columbia (1985).

Jones, I. F. et al., "Signal-To-Noise Ratio Enhancement in Multichannel Seismic Data Via the Karhunen-Loeve Transform", Geophysical Prospecting, vol. 35, 1987, pp. 12-32 (1987).

Yedlin, M. J. et al., "Application of the Karhunen-Loeve Transform to Diffraction Separation", IEEE Transactions on Acoustics, Speech and Signal Processing, vol. 35, No. 1, pp. 2-8 (Jan. 1987).

Hsu, K. et al., "Simultaneous Noise Filtering and Data Compression of ECG's", Biomedical Science Instr., vol. 17 (1981).

(List continued on next page.)

*Primary Examiner*—Ian J. Lobo
*Attorney, Agent, or Firm*—David P. Gordon; Leonard W. Pojunas; Marc D. Foodman

[57] ABSTRACT

Methods of compressing sonic data acquired as the result of well logging procedures are disclosed. Samples of each digitized formation wave component are characterized as a vector. Eigenvectors based on the formation wave component vectors are obtained, and selected wave components are correlated to the eigenvectors to obtain scaler correlation factors. The eigenvectors and correlation factors together provide a compressed representation of the selected formation wave component, particularly since only a few eigenvectors and correlation factors are required to provide an excellent reconstruction of the formation wave component.

14 Claims, 12 Drawing Sheets

OTHER PUBLICATIONS

Hsu, K. et al., "Separation and Feature Selection of Non-Stationary Processes via KL Spectra Analyses", Proceeding of Intern. Conf. Cybernetics, Atlanta (Oct. 1981).

Andrews, H. C. et al., "Singular Value Decomposition (SVD) Image Coding", IEEE Transactions on Communications, vol. 24, pp. 425–432 (Apr. 1976).

Andrews, H. C. et al., "Singular Value Decompositions and Digital Image Processing", IEEE Transactions on Acoustics, Speech and Signal Processing, vol. 24, No. 1, pp. 26–53 (Feb. 1976).

Huang, T. S. et al., "Image Restoration by Singular Value Decomposition", Applied Optics, vol. 14, No. 9, pp. 2213–2216 (Sep. 1975).

Hunt,, B. R. et al., "Karhunen—Loeve Multispectral Image Restoration—Part I: Theory", IEEEE Trans. Acoustics, Speech and Signal Processing, vol. 32, No. 3, pp. 592–599 (Jun. 1984).

COMPRESSION AND RECONSTRUCTION OF SONIC DATA

This application is a division of application Ser. No. 345,510, filed Apr. 28, 1989 now U.S. Pat. No. 4,951,266.

BACKGROUND OF THE INVENTION

1. Technical Field

The present invention is directed to methods for compressing sonic data obtained as the result of well logging procedures.

2. Background Information

Turning now to FIG. 1, a schematic diagram of a logging operation is shown. Tool, or sonde, 10 for acquiring sonic data is located in borehole 11 penetrating earth formation 12. Optionally, the borehole wall may have casing 13 cemented thereto, e.g., in a production well. The sonde is preferably lowered in the borehole by armored multiconductor cable 14 and slowly raised by surface equipment 15 over sheave wheel 16 while sonic data measurements are recorded. The depth of the tool is measured by depth gauge 17, which measures cable displacement.

Sonde 10 acquires sonic data by emitting an acoustic pulse and recording its return waveform. The sonde comprises at least one sonic source, or transmitter, and at least one detector, or receiver. The source typically produces a pulse upon excitation. The pulse travels through the casing and formation, and back to the sonde where it is detected by the receiver(s) thereon. The return waveforms can be analyzed by the sonde in situ, analyzed by data processor 18 at the surface, or stored, either in the sonde or at the site, for analysis at a remote location. In the preferred embodiment, the return waveform data is transferred to data processor 18 by cable 14 for analysis at a remote location.

Sonic data acquired in this manner is typically displayed on a chart, or log, of waveform amplitude over time versus depth. With reference to FIG. 2, a representation of sonic data in log format is shown. The data was recorded at 200 successive depth locations, the depth interval consisting of various formations, ranging from very hard limestone to very soft shaley sand.

Ideally, the waveform data records the arrival of compressional (P) waves, shear (S) waves and Stoneley (ST) waves. However, the P, S and/or ST wave components often contain undesirable components which degrade and/or mask the desired wave components. Examples of undesirable components include reflected and/or converted waves, casing arrivals, tool arrivals and noise.

The P, S and/or ST wave components are often contaminated by reflected and/or converted waves when the receiver is close to a bed boundary. Reflected waves are waves which are emitted by the source as P, S or ST waves, reflected by bed boundaries, and received as P, S or ST waves, respectively. Converted waves, on the other hand, are waves which are emitted by the source as P, S or ST waves, reflected by bed boundaries, and received as something other than P, S or ST waves, respectively. For example, a P wave which is "converted" to an S wave, and so recorded, is a converted wave.

Several examples of reflected and converted waves are marked at A through I in FIG. 2. As can be seen in FIG. 2, the reflected and converted waves occur at the same time as the desired waveform arrivals. Additionally, the frequency content of the reflected and converted waves overlaps that of the P, S and/or ST wave components.

Aside from P, S and ST wave component arrivals from the formation, the acoustic pulse travels through the steel casing, as well as the tool itself. The waveforms therefrom are commonly referred to as casing and tool arrivals, respectively. The point in time at which a waveform component arrives and is subsequently detected by the sonde's receiver(s) is commonly referred to as the waveform component's arrival time.

A steel casing is typically cemented to the borehole wall in production wells. As is well known, the cemented casing isolates the various water, gas and oil bearing zones from each other, thereby maintaining zone integrity. When the cement bond is good, the casing is substantially transparent to the sonic tool. Thus, the sonic tool is capable of logging through the casing and acquiring the formation wave components. However, when the cement bond is deficient or deteriorated, a strong wave travels through the casing, subsequently detected by the receiver(s). The casing arrival can mask the formation arrivals which have a smaller amplitude.

The tool itself also provides a path from transmitter to receiver. The tool's arrival time can appear at the same time as the formation arrival, based on tool design. Further, the amplitude of the tool arrival can be several times that of the formation arrival. As a result, the formation wave is masked by the tool arrival. As appreciated by those skilled in the art, the formation wave is desired for many reasons, e.g., to calculate the formation slowness.

Additionally, the recorded waveforms are likely to be contaminated by noise, e.g., geological, external, electronic and/or quantization. Geological noise is generated by the formation, e.g., from fracture development. External noise is due to interference from external sources, e.g., road traffic, rig activity and the like. Electronic noise is produced by the electronic components of the sonde, e.g., due to component reaction to thermal fluctuations, cross-talk or shot-noise. Quantization noise is the result of waveform degradation inherent in digitizing an analog signal, such as the waveforms acquired by the sonic detectors. Since noise tends to degrade and mask the acquired data, noise is undesirable.

Numerous filtering techniques are known for removing undesired components from waveforms. For example, the waveform can be filtered in either the temporal or the spectral domain. Such techniques, however, cannot be applied to sonic data to remove undesired components caused by reflected and/or converted waves, casing arrivals, tool arrivals and/or noise. In order for temporal or spectral filtering to be effective, there must exist a time or frequency separation, respectively, between the desired and undesired components. Such separation does not exist between the desired and undesired components in the acquired waveform.

Additionally, the waveforms can be filtered using velocity filtering techniques. Reflected waveforms appear at a receiver after the direct waveform, typically having similar frequency characteristics, albeit different velocities (i.e., arrival times). In order to separate the two, a velocity filter is employed which separates arrivals based on their different velocities.

However, velocity filtering does not filter out noise components. Additionally, conventional filtering techniques do not allow the identification of lithology, let alone allow for data compression.

SUMMARY OF THE INVENTION

Accordingly, it is an object of the present invention to compress sonic data acquired as the result of well logging procedures.

It is another object of the present invention to substantially filter out undesired components, e.g., reflected wave components, converted wave components, noise, casing arrivals, and/or tool arrivals from acquired sonic data.

It is also an object of the present invention to estimate a reflection coefficient of a bed boundary in the formation for at least one wave component of the acquired sonic data.

It is a further object of the present invention to identify the lithology of the formation traversing the borehole from which the sonic data was acquired.

One aspect of the present invention is directed to the removal of undesired components from acquired sonic data. Examples of undesired components therein include reflected wave components, converted wave components, noise, casing arrivals, and/or tool arrivals. A first embodiment of the present invention employs a Karhunen-Loeve transform. A second embodiment of the present invention employs an approximation of the Karhunen-Loeve transform.

Sonic data is recorded downhole, typically in digital format, by any conventional technique well known in the art. The acquired data set comprises a plurality of waveforms, each having compressional (P), shear (S) and/or Stoneley (ST) wave components. These components are operated upon individually by the method of the present invention. In the preferred embodiment, the P, ST and then the S wave components are filtered.

In order to remove reflected wave components, converted wave components and/or noise, the position of the P wave component's arrival time for each waveform in the data set is detected. Based on this information, the P wave component is isolated from the rest of the waveform by a time window, predetermined to capture the entire P wave component.

In the first embodiment, the n digitized samples of each P wave component are treated as an n-dimensional vector. These vectors can be plotted mathematically in an n-dimensional space. Given the similar nature of P wave components, the vectors will have a substantially similar primary direction. Fluctuation about and projection on this primary direction is a function of the formation composition traversed by the borehole, as well as undesired components recorded in the waveforms.

Karhunen-Loeve rotates the coordinate system of the n-dimensional space to a new coordinate system whose directions, characterized as eigenvectors, are aligned with the primary directions of the wave component vectors. The eigenvectors are ordered such that the first eigenvector represents the wave component's main direction, the second eigenvector represents the wave component's next main direction, et cetera. By projecting the waveforms onto the principle eigenvectors, the reflected wave components, converted wave components and/or noise component of each waveform is substantially eliminated.

In the second embodiment, an alternative method is employed for removing reflected wave components, converted wave components and/or noise. The n samples of each P wave component are averaged to obtain a template of the P wave components. The template is normalized, and this normalized template closely approximates the first eigenvector discussed above. An approximation to the second eigenvector is preferably obtained by taking the Hilbert transform of the normalized template.

Regardless of the embodiment utilized, the data set of sonic data can be compressed by employing the eigenvectors. Recalling that Karhunen-Loeve rotates the n-dimensional coordinate system to a new coordinate system, the wave component vectors can be expressed in terms of the principal eigenvectors. For example, if the 4th through 50th eigenvalues are substantially equal to zero, each wave component vector can be substantially described by correlating the wave component to the first three eigenvectors to obtain three scalar correlation factors, and using the only the first three eigenvectors and their scalar correlation factors as representations of the selected formation wave component.

Theoretically, there are n eigenvectors, corresponding to the original n-dimensional space. Practically, however, given the similar nature of the P, S and ST wave components, fluctuation about the first eigenvector is substantially limited. I have found that only the first few eigenvectors are needed to substantially describe the position of the wave component vectors. Thus, using only the first eigenvector, or an approximation thereof, about 86% of the wave components are captured. Using the first and second eigenvectors, or approximations thereof, about 92% of the wave components are captured; using the first three, about 96%.

In both embodiments, the first eigenvector, or its approximation, is correlated to the individual wave component, e.g., P, for each waveform, thereby obtaining a correlation factor. Multiplying the correlation factor by the first eigenvector, or its approximation, yields a correlated eigenvector. This correlated eigenvector is subtracted from the wave component. The residual wave component includes undesired components, e.g., reflected wave components, converted wave components, and/or noise, as well as residual wave components. In order to reduce the amount of wave component in the residual waveform, the second eigenvector, or its approximation, is correlated to the residual waveform and subtracted therefrom. This correlation/subtraction process can continue for all subsequent eigenvectors, based on desired resolution.

The residual waveform contains the undesired components, such as reflected waves, converted waves, and/or noise. This residual P wave component waveform is subtracted from the acquired (original) wave component waveform, thereby producing wave components substantially free of these undesired components. This method, repeated for all wave components, thereby produces better slowness logs.

In order to remove the undesired components of tool arrivals and casing arrivals, the tool arrival (casing arrival) is detected, and its first eigenvector, or its approximation, is determined. A correlation factor is calculated and multiplied by the first eigenvector, or its approximation, yielding a correlated first eigenvector. The correlated first eigenvector is subtracted from the waveform. Optionally, these steps may be repeated a plurality of times to account for the second through nth eigenvectors. Due to the consistent nature of the tool arrival (casing arrival), once subtraction has occurred, the remaining waveform is substantially free of tool arrivals (casing arrivals). In the preferred embodiment, two eigenvectors, or their equivalent, are employed for removing casing arrivals, and one eigenvector, or its equivalent, is preferably employed for removing tool arrivals.

In the preferred embodiment, the tool and casing arrivals are removed prior to removal of the other undesired components from the acquired waveforms.

In another aspect of the present invention, the reflection coefficient of a bed boundary in the formation can be estimated for each wave component, once the wave components are substantially free of the above-mentioned undesired components. The energy content of the reflected wave component can be obtained from the residual waveform. The energy content of the transmitted wave component can be obtained from the filtered wave component. The reflection coefficient is estimated by dividing the energy content of the reflected wave component by the energy content of the transmitted wave component.

In a further aspect of the present invention, the lithology of the formation traversing the borehole can also be identified. The P wave component, for example, can be expressed in a two-dimensional Karhunen-Loeve plane. The plane's abscissa (x-axis) is preferably the projection of the respective P wave component on the first eigenvector (obtained from the above-calculated factor correlating the P wave component vector to the first eigenvector or its approximation). The plane's ordinate (y-axis) is preferably the projection of the respective P wave component on the second eigenvector (obtained from the above-calculated factor correlating the P wave component vector to the second eigenvector or its approximation).

These points are then plotted in the Karhunen-Loeve plane. I have found that these points tend to cluster based on lithology type. For example, points obtained from wave components traveling through limestone tend to congregate in one area of the plane, while points obtained from wave components traveling through shaley sand tend to congregate in another area.

Given a plurality of wave components depicted in this manner, a database can be established for identifying the lithology of the formation traversing the borehole given its coordinates in the Karhunen-Loeve plane. Given the database and the waveform's eigenvectors, the lithology of the formation through which the wave traveled can be identified.

DESCRIPTION OF THE PREFERRED EMBODIMENT(S)

Figure 3A:
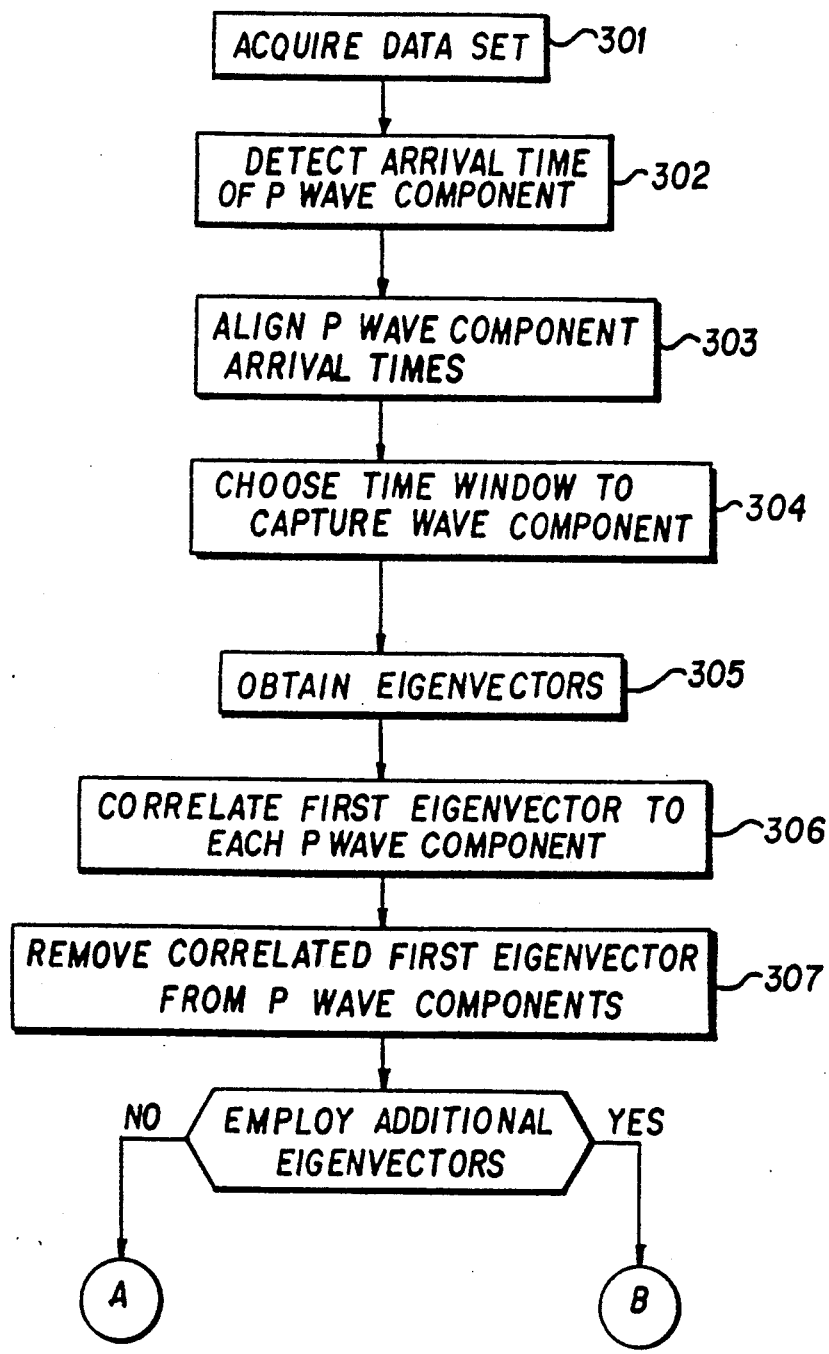
FIGS. 3a and 3b illustrate a first embodiment of the present invention for substantially removing reflected wave components, converted wave components and/or noise from acquired sonic data employing a Karhunen-Loeve transformation.
Figure 3B:
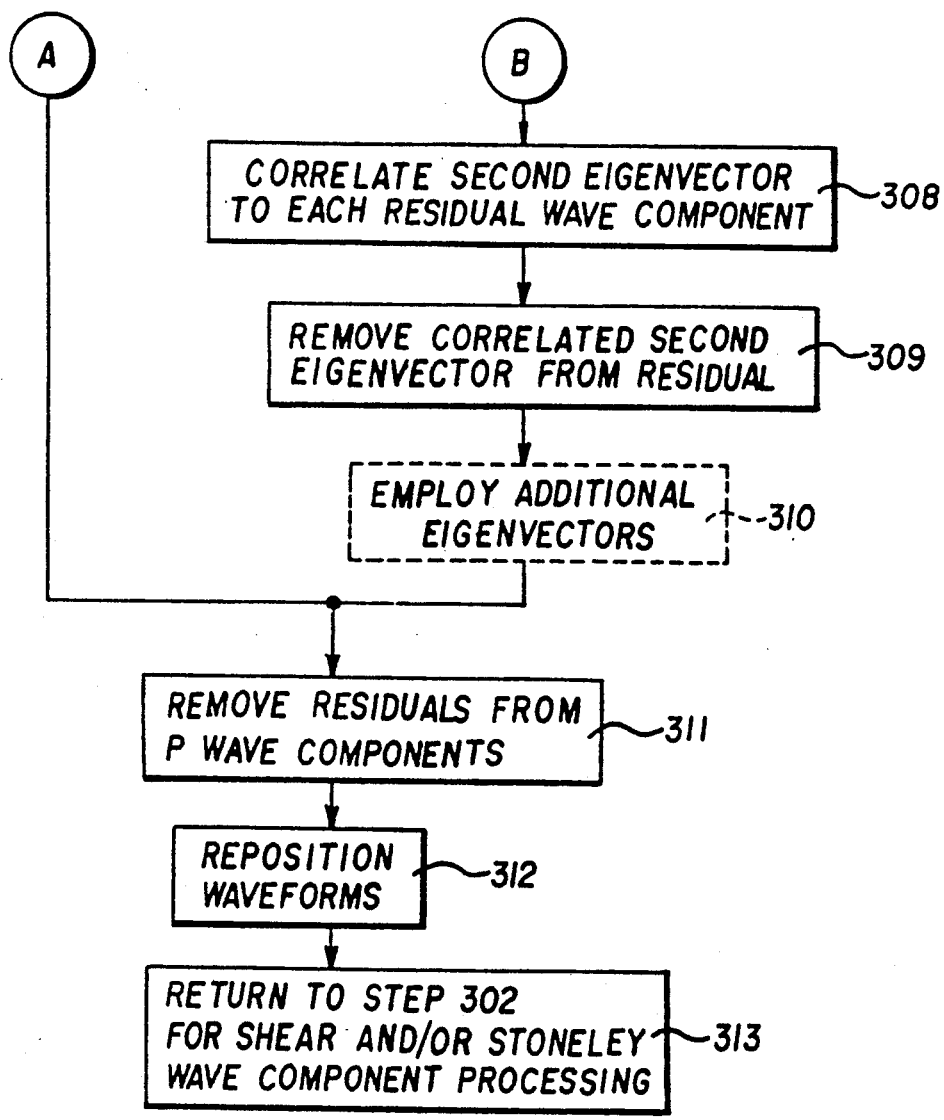

Turning now to FIGS. 3a and 3b, the first embodiment of the method of the present invention for substantially removing reflected wave components, converted wave components and/or noise from acquired sonic data employing a Karhunen-Loeve transformation is described.

Figure 1:
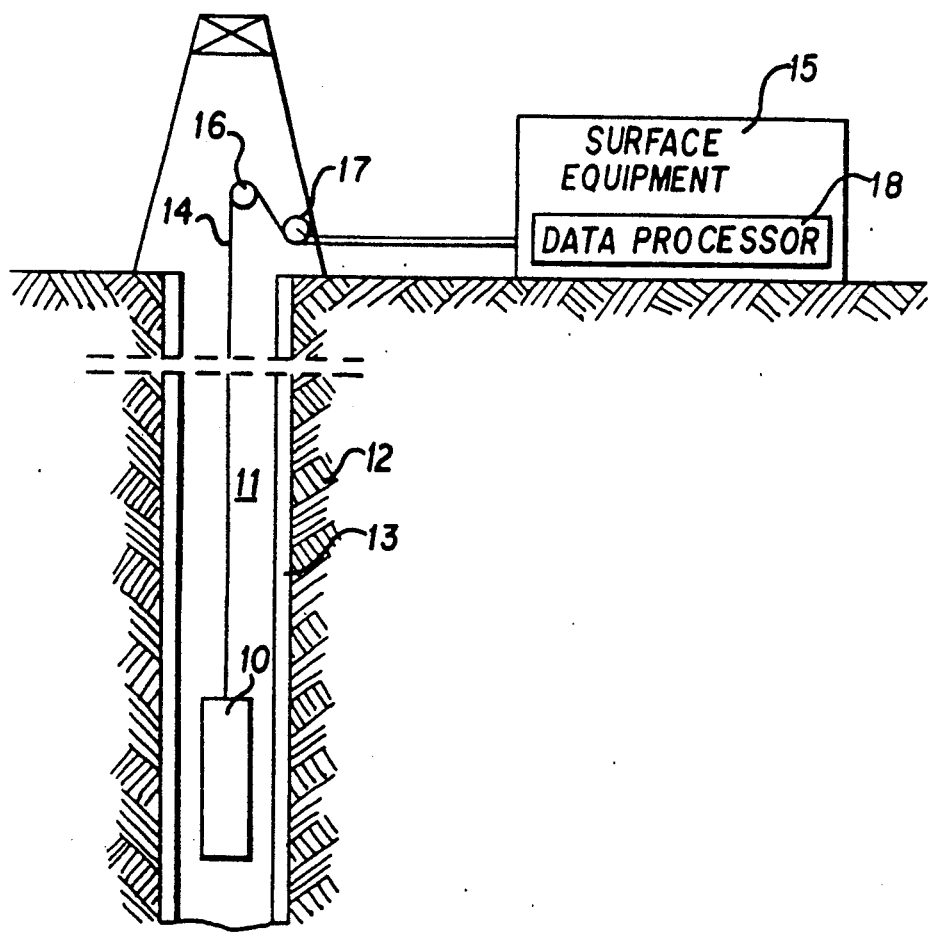
FIG. 1 illustrates a schematic diagram of a logging operation.
Figure 2:
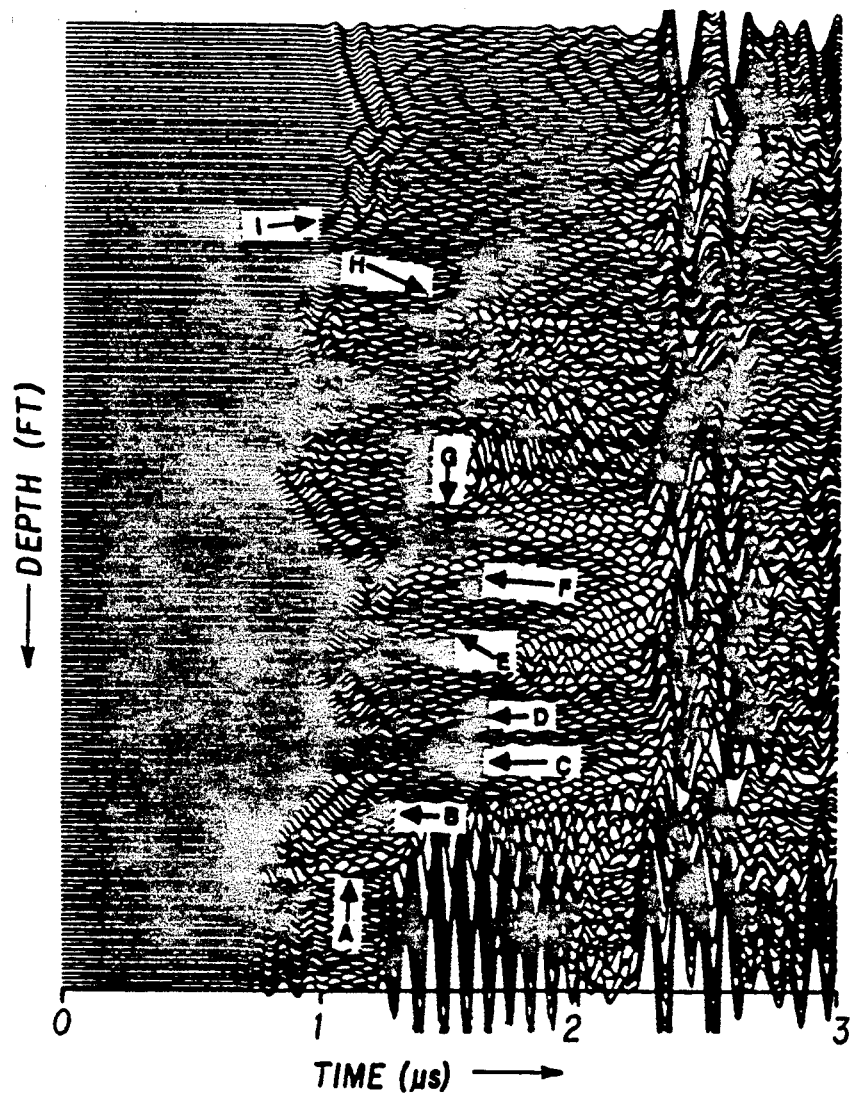
FIG. 2 illustrates acquired sonic logging data in log format.

At step 301, the sonic data is acquired. In the preferred embodiment, the waveforms are digitized using a sampling rate of 10 $\mu$s. Other sampling rates, depending upon desired accuracy and the Nyquest criterion, will be obvious to one skilled in the art. Methods of acquiring sonic data are well known to those skilled in the art, for example, as shown with reference to FIG. 1. Sonic data is typically acquired from substantially the entire length of the borehole. The data set shown in FIG. 2 comprises 200 waveforms, each having P, S and ST wave components.

Preferably, a 500 microsecond ($\mu$s) time window is employed with a sampling rate of 10 $\mu$s, thereby obtaining 50 sampled points for the P wave components of each waveform.

It is to be understood, however, that the dimensions of the data set used herein is for illustrative purposes only. Additionally, although the data set used herein includes P, S and ST wave components, it is to be understood that a sonic data set having any number of wave components can be used in conjuntion with the present invention.

As described hereinbelow, the method of the present invention is applied to remove reflected wave components, converted wave components and/or noise, first on the P wave components, then on the S and/or ST wave components, in either order. Subsequently, the method of the present invention is applied to remove tool and casing arrivals. In the preferred embodiment, however, the tool and casing arrivals are removed first, followed by the removal of the reflected wave components, converted wave components and/or noise, first on the P wave components, then on the S and/or ST wave components, in either order. Other orders of operation, however, can be performed.

At step 302, the arrival time of each P wave component is detected. Due to the nonhomogeneity of the formation, the P wave component of each waveform arrives at a different time, relative to each other. In the preferred embodiment, a threshold detection scheme is applied to the waveforms to detect their respective arrival times. However, other arrival time detection schemes, e.g., a zero-crossing detector having an amplitude threshold requirement, can be employed.

Figure 4:
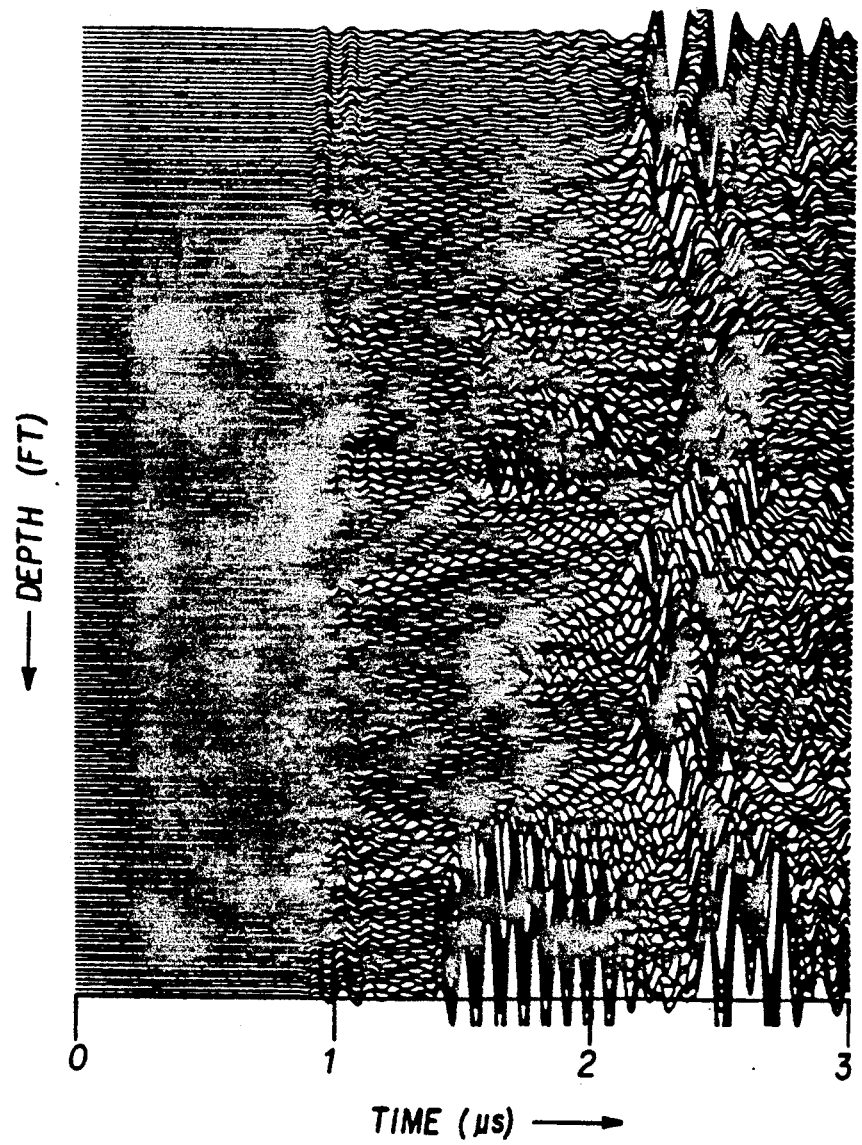
FIG. 4 shows the sonic data of FIG. 2 such that their respective P wave component arrival times are aligned.

At step 303, the waveforms are preferably time shifted such that their P wave component arrival times are aligned. Alignment of the P wave component arrival times is shown with reference to FIG. 4. Alternatively, the P wave components arrival times can be detected and stored for use in conjunction with the remaining steps described hereinafter, thereby eliminating the need to align the wave components.

At step 304, a time window is selected. Preferably, a 500 microsecond ($\mu$s) time window is employed. Given the sampling rate of 10 $\mu$s, the window will contain 50 sampled points for the P wave components of each waveform.

The time window preferably captures the entire P wave component. The P wave component is typically 300 to 400 $\mu$s long. Additionally, the time window preferably commences 50 $\mu$s before the detected P wave component arrival. This window position insures that the entire P wave component is captured for processing, as the P wave component's arrival time may be too small for detection and/or buried by noise. Thus, the time window of 500 $\mu$s is preferably employed. Other time window values, either shorter or longer, can also be used.

At step 305, the eigenvectors are obtained. The n-samples of each P wave component can be represented as a P wave component vector in n-space. The Karhunen-Loeve transformation generates eigenvectors orthogonal to each other, derived from the statistics of the P wave component vectors. Eigenvectors are generated based on a correlation matrix, CM, defined by the following equation:

$$CM = \lim_{k \to \infty} \frac{1}{k} \left( \sum_{j=1}^{k} S_j S_j^T \right)$$

where
k represents the number of vectors in the data set;
$S_j$ represents the vector; and
$S_j^T$ represents the transpose of the vector.

The correlation matrix definition is based on the statistical characteristics of the vectors given an infinite data set. As the data set of sonic logging is limited to m waveforms, the correlation matrix is approximated by the following equation:

$$CM = \frac{1}{m} \left( \sum_{j=1}^{m} S_j S_j^T \right)$$

where
m represents the number of waveforms in the data set;
$S_j$ represents the wave component vector; and
$S_j^T$ represents the transpose of the wave component vector.

Given the P wave component vectors, the correlation matrix CM is calculated. The eigenvectors are obtained from the correlation matrix according to the following equation:

$$CM \phi_i = \lambda_i \phi_i$$

where
$\phi_i$ represents the ith eigenvector; and
$\lambda_i$ represents the ith scalar for the ith eigenvector.

The scalar for the ith eigenvector is commonly referred to as its eigenvalue. The eigenvalues are preferably ranked according to magnitude, the first eigenvalue being the largest. As discussed above, the first eigenvalue represents the average of the wave component vectors in the first eigenvector's direction. The second through mth eigenvalues represent the average variation of the wave component vectors in the second through mth eigenvector's direction, respectively.

In the preferred embodiment, the m eigenvectors are obtained using the IMSL software package, available from IMSL, Incorporated, Customer Relations, 2500 ParkWest Tower One, 2500 CityWest Boulevard, Houston, Tex., 77042-3020. However, other software packages are available and can be used for calculating the correlation matrix, the eigenvectors and their corresponding eigenvalues. As will be appreciated by those skilled in the art, the eigenvectors contain the same number of points as there are samples in the P wave component.

At step 306, the first eigenvector is correlated to each P wave component in the data set, thereby obtaining a correlation factor for each P wave component. In the preferred embodiment, the correlation factors are obtained by taking the inner product of the first eigenvector and each P wave component. The inner product is obtained by multiplying each first eigenvector point with each P wave component sample and cumulating the results to obtain a scalar value. Obtaining the correlation factor of the first eigenvector to the individual P wave components can be represented by the following equation:

$$a_j = \sum_{i=1}^{n} E_1(i) S(i)_j \quad \text{for } j = 1 \text{ to } m$$

where
$a_j$ represents the correlation factor for the jth waveform;
$E_1(i)$ represents the ith sample of the first eigenvector;
$S(i)_j$ represents the ith sample of the P wave components contained in the time window;
n represents the number of samples; and
m represents the number of waveforms contained in the data set.

At step 307, a correlated first eigenvector is removed from its respective P wave components, preferably by subtraction. In the preferred embodiment, the correlated first eigenvector is obtained for each of the m waveforms by multiplying each of the first eigenvector points by the correlation factor. Removing the correlated first eigenvector from the individual P wave component for each waveform can be represented by the following equation:

$$S_R(i)_j = S(i)_j - a_j E_1(i) \quad \text{for } i=1 \text{ to } n; \, j=1 \text{ to } m$$

where
$S_R(i)_j$ represents the ith sample of the residual samples in the time window for the jth waveform;
$S(i)_j$ represents the ith sample of the P wave component for the jth waveform;
$E_1(i)$ represents the ith sample of the first eigenvector;
n represents the number of samples; and
m represents the number of waveforms in the data set.

Removing the correlated first eigenvector from the P wave component yields a residual for each of the waveforms. The residual comprises reflected wave components, converted wave components and noise, as well as a residual P wave component.

As stated above, the first eigenvector captures about 86% of the wave component. Should greater accuracy be desired, additional eigenvectors are employed, as set forth in steps 308 through 310. Otherwise, only steps 311 through 313 are followed.

At step 308, the second eigenvector is correlated to each residual wave component, preferably as discussed above with reference to step 306. Obtaining the correlation factor of the second eigenvector to each residual wave component can be represented by the following equation:

$$b_j = \sum_{i=1}^{n} E_2(i) S_R(i)_j \text{ for } j = 1 \text{ to } m$$

where
$b_j$ represents the correlation factor for the jth waveform;
$E_2(i)$ represents the ith sample of the second eigenvector;
$S_R(i)_j$ represents the ith sample of the residual wave components for the jth waveform;
n represents the number of samples; and
m represents the number of waveforms contained in the data set.

At step 309, the correlated second eigenvector is removed from its respective residual wave components, preferably as discussed above with reference to step 307. Removing the correlated second eigenvector from the respective residual wave components can be represented by the following equation:

$$S'_R(i)_j = S_R(i)_j - b_j E_2(i) \text{ for } i = 1 \text{ to } n; j = 1 \text{ to } m$$

where
$S'_R(i)_j$ represents the ith sample of the second residual for the jth waveform;
$S_R(i)_j$ represents the ith sample of the first residual for the jth waveform;
$E_2(i)$ represents the ith sample of the second eigenvector;
n represents the number of samples; and
m represents the number of waveforms in the data set.

As stated above, the first and second eigenvectors capture about 92% of the wave component. Should greater accuracy be desired, additional eigenvectors may employed at step 310. In the preferred embodiment, step 310 parallels steps 308 and 309, wherein the jth eigenvector is correlated to the (j−1)th residual wave component samples, and the correlated jth eigenvector is subtracted from the most recent residual wave component samples calculated.

At step 311, the residual wave components are removed from the aligned P wave components, preferably by subtraction. In this case where only the first eigenvector was employed (to step 307), the P wave components are about 86% free of undesired wave components. In this case, removing the residual wave components from the aligned P wave components for each waveform can be represented by the following equation:

$$S_c(i)_j = S(i)_j - S_R(i)_j \text{ for } i = 1 \text{ to } n; j = 1 \text{ to } m$$

where
$S_c(i)_j$ represents the ith sample of the jth wave component substantially free of reflected wave components, converted wave components and/or noise;
$S(i)_j$ represents the ith sample of the jth wave component;
$S_R(i)_j$ represents the ith sample of the jth residual wave component;
n represents the number of samples; and
m represents the number of waveforms.

In the case where the first and second eigenvectors were employed (to step 309), the P wave components are about 92% free of undesired wave compoents. In this case, removing the residual wave components from the aligned P wave components for each waveform can be represented by the following equation:

$$S_c(i)_j = S(i)_j - S'_R(i)_j \text{ for } i = 1 \text{ to } n; j = 1 \text{ to } m$$

where
$S_c(i)_j$ represents the ith sample of the jth wave component substantially free of reflected wave components, converted wave components and/or noise;
$S(i)_j$ represents the ith sample of the jth wave component;
$S'_R(i)_j$ represents the ith sample of the jth residual wave component;
n represents the number of samples; and
m represents the number of waveforms.

Figure 5:
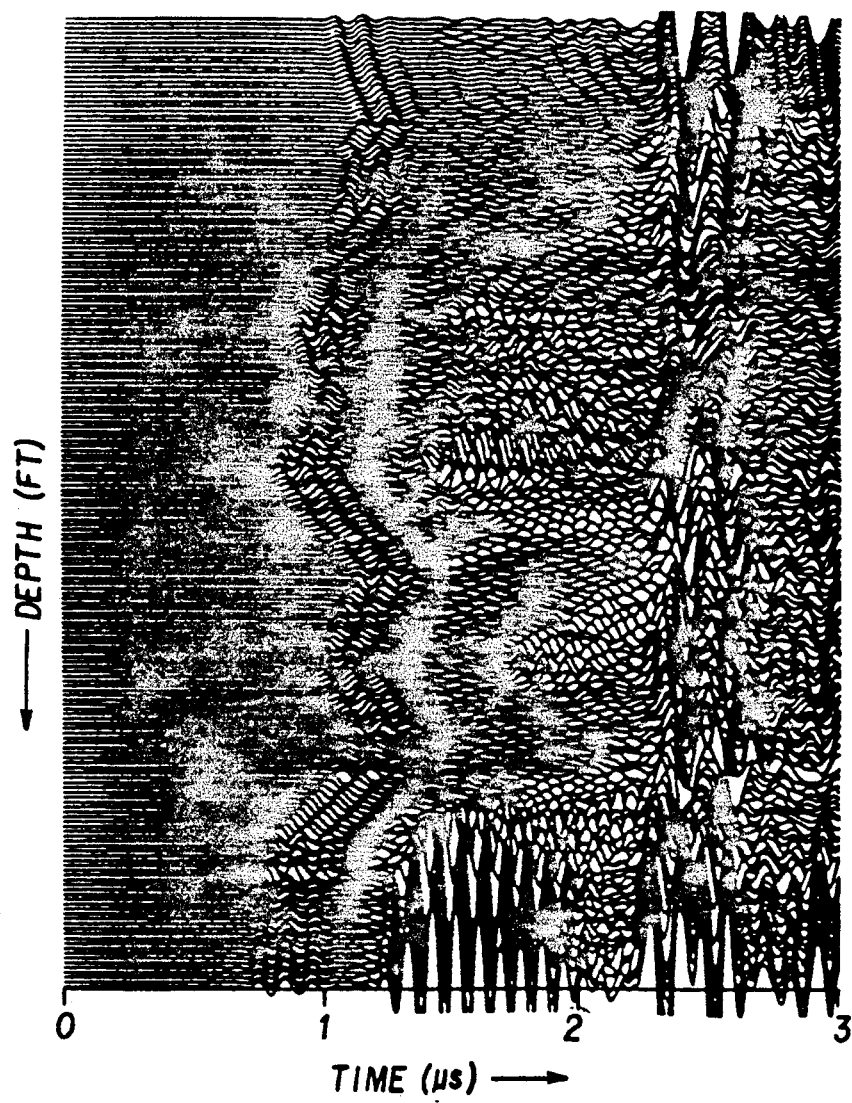
FIG. 5 shows the sonic data of FIG. 2 wherein the reflected wave components, converted wave components and/or noise, calculated from the first eigenvector, are removed therefrom.
Figure 6:
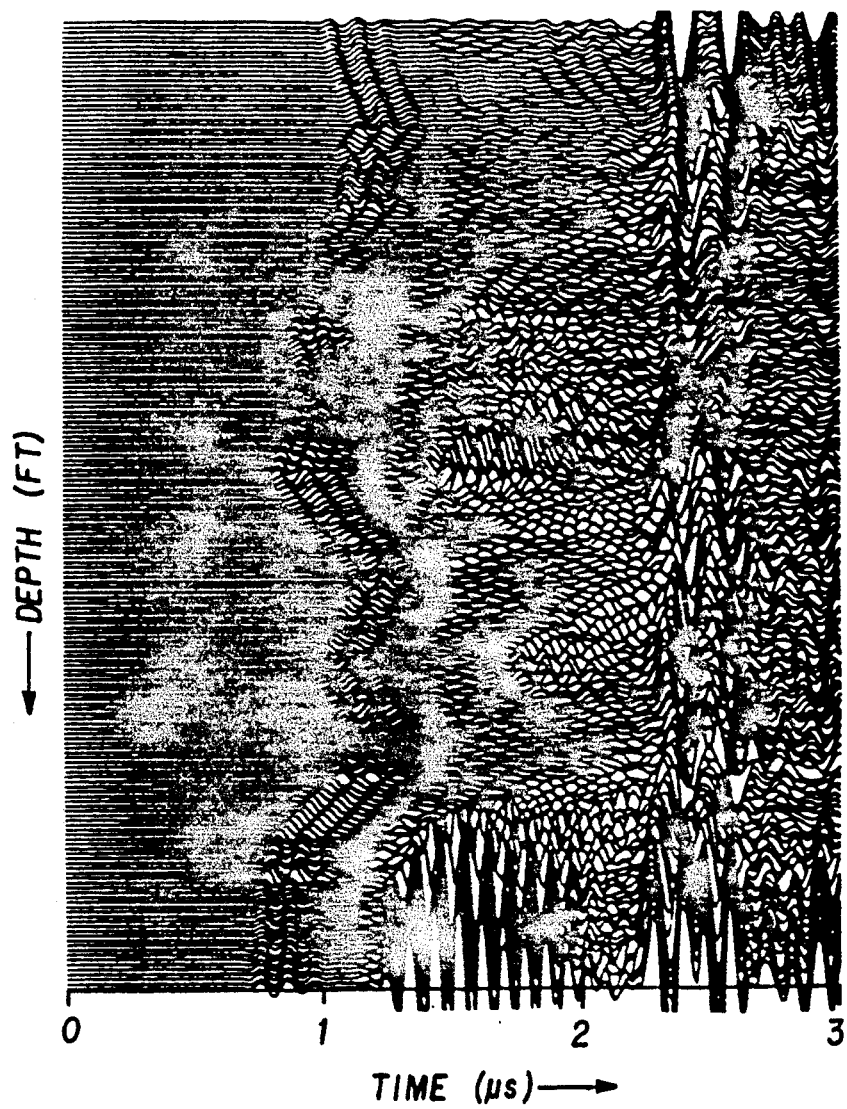
FIG. 6 shows the sonic data of FIG. 2 wherein the reflected wave components, converted wave components and/or noise, calculated from the first and second eigenvectors, are removed therefrom.

At step 312, the aligned waveforms are time shifted to return them to their original time positions, relative to each other. As shown with reference to FIG. 5, the waveforms are shown with the first residual removed, as a result of step 307. As shown with reference to FIG. 6, the waveforms are shown with the first and second residuals removed, as a result of step 309.

As set forth in step 313, in order to remove undesired wave components from the shear (S) and/or Stoneley (ST) wave components, steps 302 through 312 are repeated. It is to be understood that "S" and "ST" would replace the "P" term through out FIGS. 3a and 3b.

Figure 7:
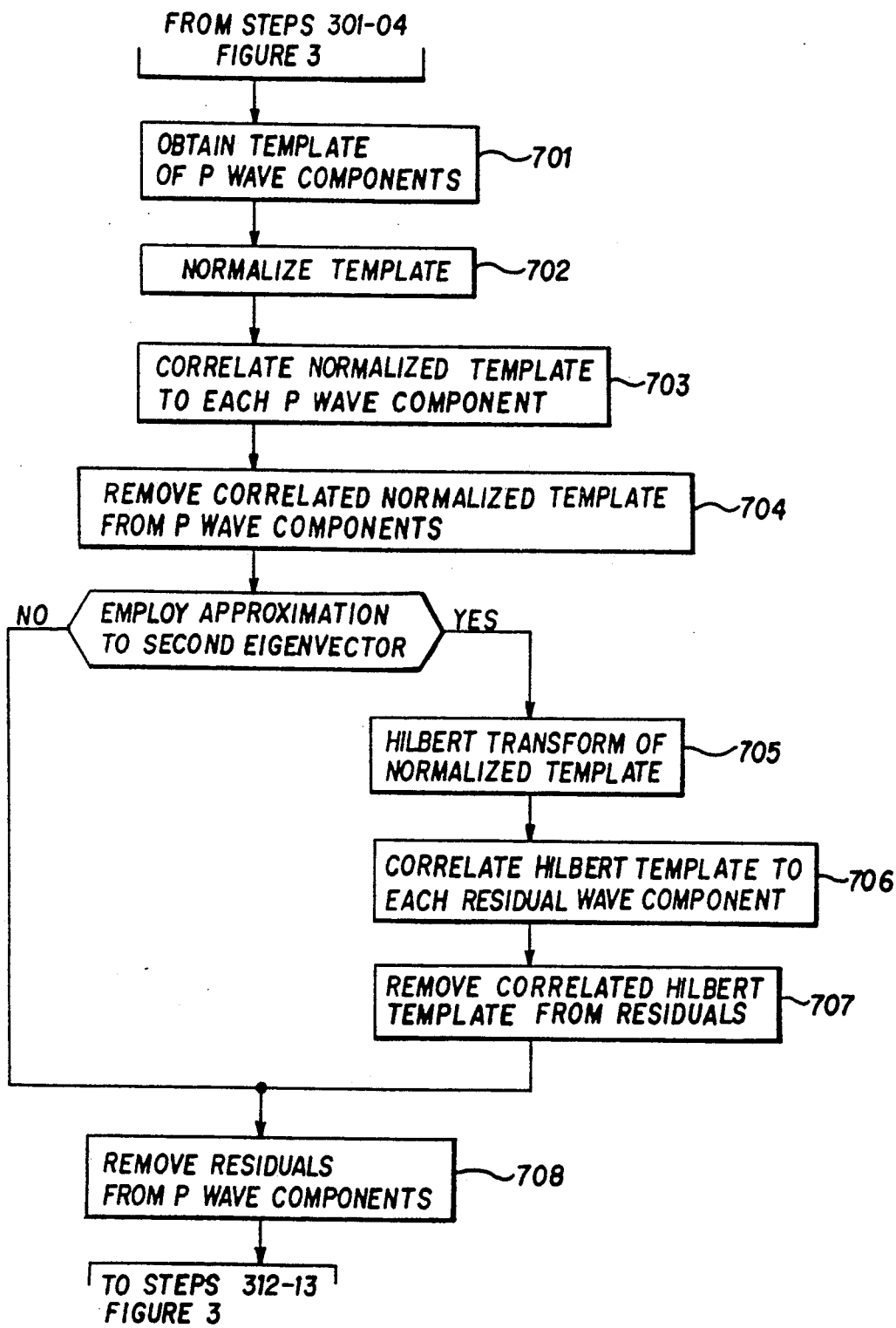
FIG. 7 illustrates a second embodiment of the present invention for substantially removing reflected wave components, converted wave components and/or noise from acquired sonic data employing an approximation of the Karhunen-Loeve transformation of FIG. 3.

Turning now to FIG. 7, a second embodiment of the method of the present invention for substantially removing reflected wave components, converted wave components and/or noise from acquired sonic data employing an approximation to the Karhunen-Loeve transformation is described. In the second embodiment of the present invention, the first and second eigenvectors are approximated, thereby replacing steps 305 through 311 of the first embodiment, as shown in FIGS. 3a and 3b.

At step 701, a template of the P wave components is obtained. In the preferred embodiment, the template is obtained by stacking the P wave components. Stacking preferably involves cumulating corresponding waveform samples, located in the predetermined time window established at step 305, and dividing these cumulated samples by the number of waveforms cumulated.

The template of step 701 represents the average value at each sampled point without reflected wave components, converted wave components and noise therein. As reflected wave components, converted wave components and noise are mathematically random, these components statistically average out to zero. P waves, on the other hand, are coherent, thereby allowing the stacking procedure to produce non-zero results where non-zero P wave components are present.

It should be noted that the time window may, either by design or otherwise, contain a portion of the S wave component. Due to the fact that the S wave component arrival times vary according to formation type, the S wave components should not all line up when the P wave components are aligned (step 303). Thus, any S wave components captured by the time window should not be coherent and tend to average out to zero after stacking.

At step 702, the template is normalized. In the preferred embodiment, a normalization factor for the template is obtained by cumulating the square of each sample point in the template and then taking the square root of the cumulation. The normalization factor can be represented by the following equation:

$$N = \sqrt{\sum_{i=1}^{n} T(i)^2}$$

where
N represents the normalization factor;
T(i) represents the ith sample of the template; and
n represents the number of template samples.

The template is normalized by dividing each template point by the normalization factor. The normalization of the template can be represented by the following equation:

$$T_N(i) = T(i)/N \text{ for } i = 1 \text{ to } n$$

where
$T_N(i)$ represents the ith sample of the normalized template;
T(i) represents the ith sample of the template;
N represents the normalization factor; and
n represents the number of template samples.

The template represents the average P wave component for the m waveforms in the data set. The normalized template represents an approximation of the first eigenvector.

At step 703, the normalized template is correlated to each P wave component. In the preferred embodiment, a correlation factor for each P wave component is obtained by taking the inner product of the normalized template and the respective P wave component. The inner product is preferably obtained by multiplying each normalized template sample with the corresponding P wave component sample and cumulating the results to obtain a scalar value. Obtaining the correlation factor of the normalized template to the P wave components can be represented by the following equation:

$$a_j = \sum_{i=1}^{n} T_N(i)S(i)_j \quad \text{for } j = 1 \text{ to } m$$

where
$a_j$ represents the correlation factor for the jth waveform;
$T_N(i)$ represents the ith sample of the normalized template;
S(i) represents the ith sample of the jth P wave component;
n represents the number of samples; and
m represents the number of waveforms in the data set.

At step 704, the correlated template is removed from its respective P wave components, preferably by subtraction. In the preferred embodiment, the correlated template is obtained for each of the m waveforms by multiplying the normalized template by the correlation factor for the respective waveform. Removing the correlated template from the respective P wave component can be represented by the following equation:

$$S_R(i)_j = S(i)_j - a_j T_N(i) \text{ for } i = 1 \text{ to } n; j = 1 \text{ to } m$$

where
$S_R(i)_j$ represents the ith sample of the jth residual;
$S(i)_j$ represents the ith sample of the jth P wave component;
$a_j$ represents the correlation factor for the jth wave component;
$T_N(i)$ represents the ith sample of the normalized template;
n represents the number of samples; and
m represents the number of waveforms in the data set.

Removing the normalized template from the respective P wave component yields a residual for each of the waveforms. The residual comprises reflected wave components, converted wave components and noise, as well as a residual P wave component.

As with the first eigenvector, the approximation to the first eigenvector also captures about 86% of the wave component. Should greater accuracy be desired, an approximation to the second eigenvector can employed, as set forth in steps 705 through 707. Otherwise, only step 708 is followed.

At step 705, an approximation to the second eigenvector is obtained. In the preferred embodiment, the approximation to the second eigenvector is obtained by taking the Hilbert transform of the normalized template. The Hilbert transform is well known in the art and need not be discussed in detail herein. As will be appreciated in the art, the Hilbert transform of the normalized template yields a normalized Hilbert template.

At step 706, the normalized Hilbert template is correlated to each residual wave component, preferably as discussed above with reference to step 703. Obtaining the correlation factor of the normalized Hilbert template to each residual P wave components can be represented by the following equation:

$$b_j = \sum_{i=1}^{n} T_H(i)S_R(i)_j \quad \text{for } j = 1 \text{ to } m$$

where
$b_j$ represents the correlation factor for the jth waveform;
$T_H(i)$ represents the ith sample of the Hilbert template;
$S_R(i)$ represents the ith sample of the jth residual wave component;
n represents the number of samples; and
m represents the number of waveforms in the data set.

At step 707, the correlated Hilbert template is removed from the residual wave components for which it was correlated, preferably as discussed above with reference to step 704. Removing the correlated Hilbert template from the respective residual wave components can be represented by the following equation:

$$S'_R(i)_j = S_R(i)_j - b_j T_H(i) \text{ for } i = 1 \text{ to } n; j = 1 \text{ to } m$$

where
$S'_R(i)_j$ represents the ith sample of the jth second residual;
$S_R(i)_j$ represents the ith sample of the jth first residual;
$b_j$ represents the Hilbert correlation factor for the jth wave component;

$T_H(i)$ represents the ith sample of the Hilbert template;
n represents the number of samples; and
m represents the number of waveforms in the data set.

At step 708, the residual wave components are removed from the aligned P wave components, preferably by subtraction. In this case where only an approximation to the first eigenvector was employed (to step 704), the P wave components are about 86% free of undesired wave components. In this case, removing the residual wave components from the aligned P wave components for each waveform can be represented by the following equation:

$$S_c(i)_j = S(i)_j - S_R(i)_j \text{ for } i=1 \text{ to } n; j=1 \text{ to } m$$

where
$S_c(i)_j$ represents the ith sample of the jth wave component substantially free of reflected wave components, converted wave components and/or noise;
$S(i)_j$ represents the ith sample of the jth wave component;
$S_R(i)_j$ represents the ith sample of the jth first residual wave component;
n represents the number of samples; and
m represents the number of waveforms.

In the case where approximations to the first and second eigenvectors were employed (to step 707), the P wave components are about 92% free of undesired wave components. In this case, removing the residual wave components from the aligned P wave components for each waveform can be represented by the following equation:

$$S_c(i)_j = S(i)_j - S'_R(i)_j \text{ for } i=1 \text{ to } n; j=1 \text{ to } m$$

where
$S_c(i)_j$ represents the ith sample of the jth wave component substantially free of reflected wave components, converted wave components and/or noise;
$S(i)_j$ represents the ith sample of the jth wave component;
$S'_R(i)_j$ represents the ith sample of the jth second residual wave component;
n represents the number of samples; and
m represents the number of waveforms.

Thereafter, the aligned waveforms are time shifted to return them to their original time positions (step 312) and/or the steps are repeated to remove reflected wave components, converted wave components and/or noise from the S and/or ST wave components (step 313).

In both the first and second embodiments, the time window for capturing the shear wave component is preferably at least as wide as for the P wave component. The time window for capturing the Stoneley wave component, on the other hand, is preferably at least as wide as from the Stoneley arrival to the end of the recorded waveform. As is known in the art, the Stoneley wave component is typically longer than the time for which the waveform is recorded. In the preferred embodiment, after the tool and casing arrivals have been filtered, it is preferable to filter the P wave component, the Stoneley wave component, and then the S wave component. The P is preferably first, due to its earliest arrival time, and the Stoneley is next, due to its dominant amplitude relative to the S wave component.

As is known in the art, boreholes which are selected for production logging are typically lined with a casing and cemented in place in order to isolate zones in the formation. A good cement seal between casing and formation allows the casing and cement seal to be substantially transparent the tool's acoustic pulses. However, when the casing is poorly bonded to the formation, either due to an initially poor cementation job or through degradation over time, a portion of the tool's acoustic pulse is captured by the casing, resonating therein and detected by to the tool as casing arrivals. Casing arrivals, which typically appear before the P wave component, are recorded at substantially the same time over the course of the affected area.

Tool arrivals are the product of the acoustic wave traveling from the transmitter, through the tool, to the receiver(s). As the spacing between the transmitter and receiver remains constant, tool arrivals are always recorded at substantially the same time, for a given transmitter-receiver pair, throughout the logging process.

Figure 8:
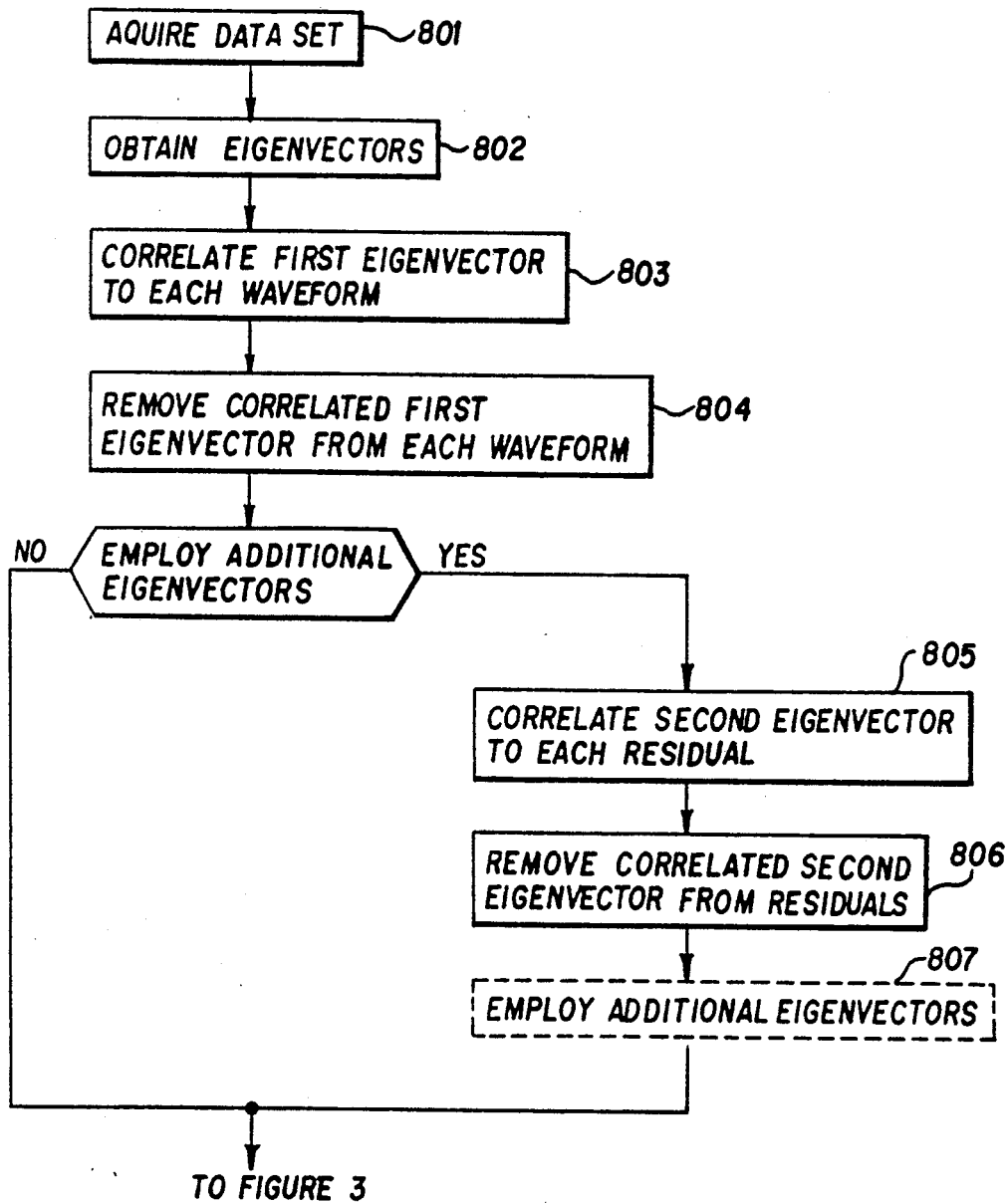
FIG. 8 illustrate a first embodiment of the present invention for substantially removing casing and tool arrivals from acquired sonic data employing a Karhunen-Loeve transformation.

Turning now to FIG. 8, a first embodiment of the present invention for substantially removing casing and tool arrivals is illustrated. After the data has been acquired at step 801, the first eigenvector is obtained at step 802 for the entire waveform, preferably as set forth at step 305. Due to the fact that the casing and tool arrivals appear at substantially the same time, it is not necessary to align the arrivals. Additionally, as the P, S and ST wave components will typically appear randomly relative to the casing and tool arrivals, it is not necessary to employ a time window.

At step 803, the first eigenvector is correlated to each waveform in the data set, thereby obtaining a correlation factor for each waveform, preferably as set forth at step 306.

At step 804, a correlated first eigenvector is removed from its respective waveforms, preferably as set forth at step 307. Removing the correlated first eigenvector from each waveform yields a residual for each of the waveforms. The residual comprises reflected wave components, converted wave components and noise, as well as P, S and ST wave components. The residuals, however, do not contain an appreciable amount of casing or tool arrivals. However, should greater accuracy be desired, additional eigenvectors are employed, as set forth in steps 805 through 807.

At step 805, the second eigenvector is correlated to each residual waveform, preferably as discussed above with reference to step 306.

At step 806, the correlated second eigenvector is removed from its respective residual waveforms, preferably as discussed above with reference to step 309.

Additional eigenvectors may be employed at step 807, preferably as set forth at step 310. Thereafter, the residual waveform contains the P, S and ST wave components substantially free of casing and tool arrivals, and the reflected wave components, converted wave components and/or noise may be removed as explained above with reference to FIGS. 3 and/or 7.

Figure 9:
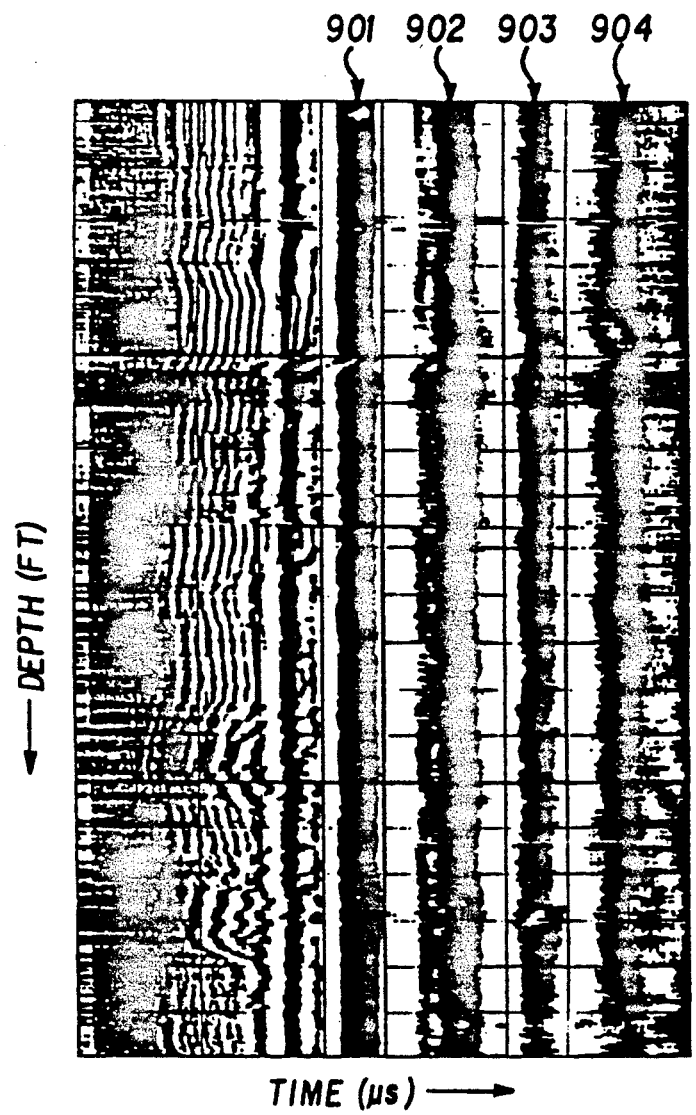
FIG. 9 illustrates an acquired sonic data set having multiple tool arrivals.
Figure 10:
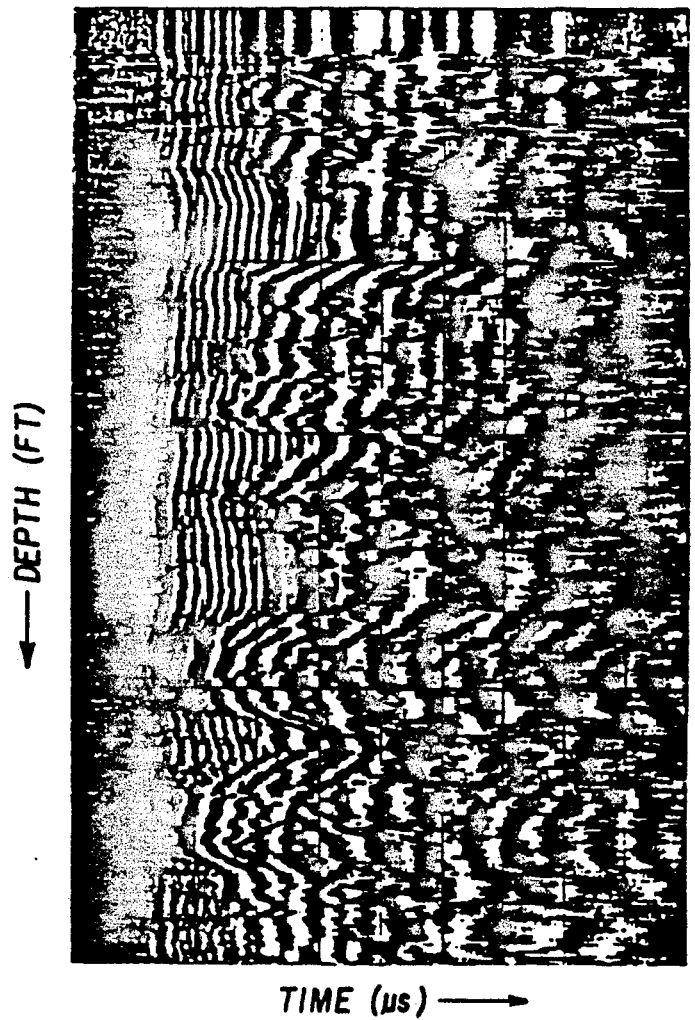
FIG. 10 illustrates the data set of FIG. 9 with the tool arrivals removed therefrom.

With reference to FIG. 9, an acquired sonic data set is illustrated having tool arrivals 901 through 904 which substantially mask the shear wave components. Employing the first eigenvector and the method discussed above, the tool arrivals are removed, allowing the shear waves to be more readily illustrated, as shown with reference to FIG. 10.

Alternatively, in a second embodiment of the present invention for substantially removing casing and tool arrivals, approximations to the first and second eigenvectors may be employed. Thus, steps 802 through 807 would be replaced with steps 701 through 707.

In the preferred embodiment, two eigenvectors, or their approximations, are employed for removing casing arrivals, while one eigenvector, or its approximation, is preferably employed for removing tool arrivals.

In another embodiment of the present invention, the reflection coefficient of a bed boundary in the formation can be estimated for each wave component. The reflection coefficient is estimated by dividing the energy content of the reflected wave component, obtained from the residual waveform, by the energy content of the transmitted wave component, obtained from the filtered wave component. In the preferred embodiment, the energy content of the reflected and converted wave components are calculated by cumulating the square the amplitude of each sample. Other methods of calculating the energy content of the reflected and transmitted wave components are well known to those skilled in the art and can be employed in the alternative.

The method of the present invention for estimating a reflection coefficient of a bed boundary in the formation represents an alternative to methods known in the art. The prior art calculated the reflection coefficient according to the following equation:

$$\frac{\rho_2 v_2 - \rho_1 v_1}{\rho_2 v_2 + \rho_1 v_1}$$

where
the transmitted wave travels through layer 1 and is reflected by layer 2;
$v_i$ represents the velocity of the respective layers; and
$\rho$ represents the density of the respective layers.

The velocity and density measurements of the layers were typically acquired in the prior art from a sonic and density log, respectively. Thus, both a sonic and a density logging tool have to be employed. The above method of the present invention for estimating a reflection coefficient based on transmitted and reflected wave components requires only the use of a sonic tool. Thus, substantial savings of both time and money will be realized by employing this method of the present invention.

Figure 11:
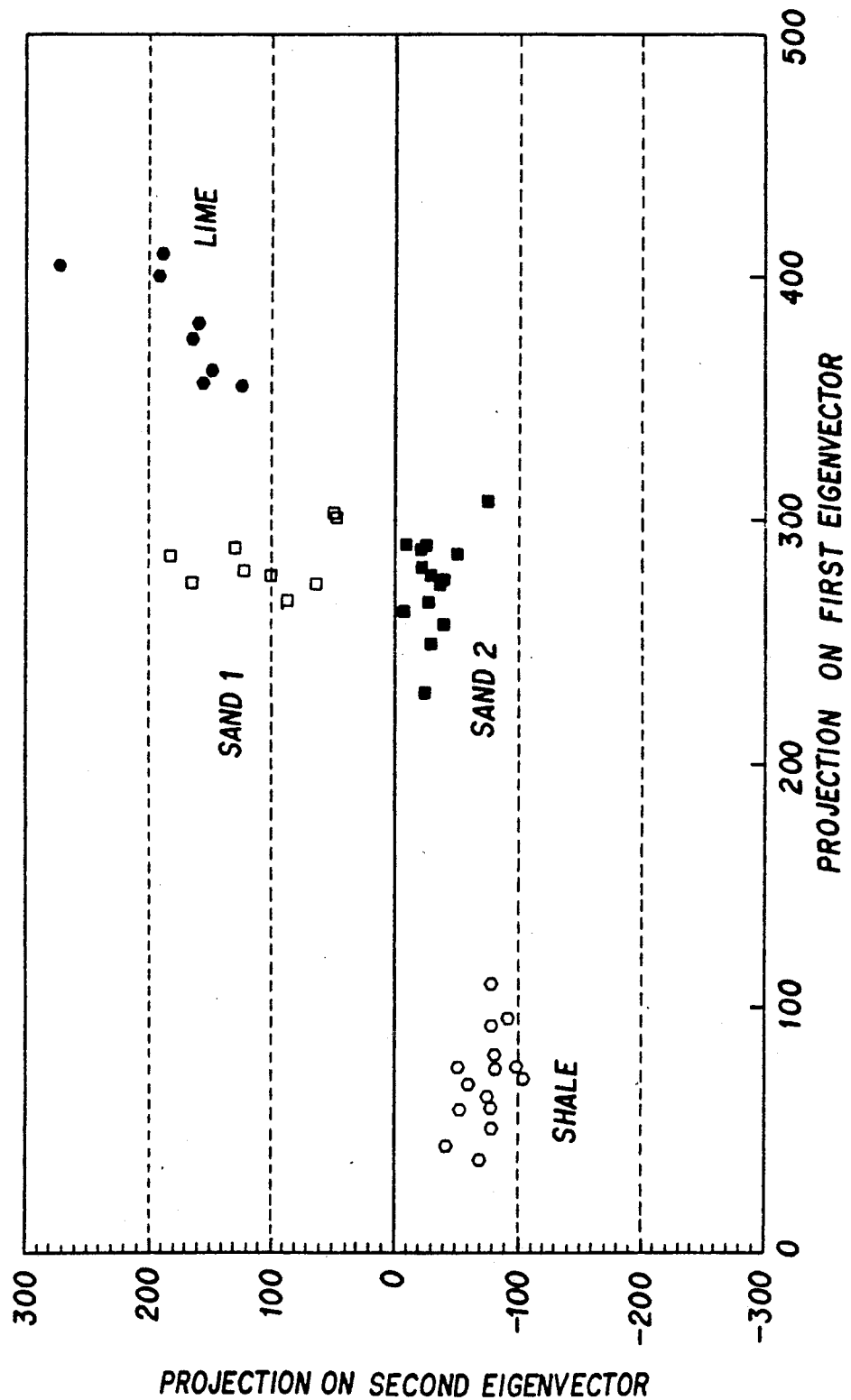
FIG. 11 illustrates the identification of formation lithology based on a plane formed from the projections of the P wave components on the first and second eigenvectors.

In yet another embodiment of the present invention, the lithology of the formation traversing the borehole can be identified. Acoustic pulses which travel through like media tend to exhibit like characteristics. I have found that plotting wave components based on their projection on the eigenvectors results in a cluster of wave components based on the media through which they traveled. As an example, FIG. 11 shows a plurality of P wave components plotted in a two-dimensional plane. The abscissa (x-axis) is the projection of the P wave component on the first eigenvector, or its approximation, while the ordinate (y-axis) is the projection of the P wave component on the second eigenvector, or its approximation.

It turns out that these points tend to cluster based on lithology type. For example, points obtained from wave components traveling through limestone tend to congregate in one area of the plane, while points obtained from wave components traveling through shaley sand tend to congregate in another area. FIG. 11 identifies four types of lithologies, e.g., shale, limestone and two different sand types, using the projection of the P wave component on the first and second eigenvectors for the acquired sonic data of FIG. 2.

The projection on the first eigenvector is the factor $a_j$, calculated at step 306 or 703, correlating the P wave component to the first eigenvector or its approximation, respectively. The projection on the second eigenvector is the factor $b_j$, calculated at step 308 or 706, correlating the P wave component to the second eigenvector or its approximation, respectively.

Given a plurality of wave components depicted in this manner, a database can be established to identify the lithology of the formation traversing the borehole given its coordinates in a plane whose axes are the component's projections on their eigenvectors.

It is noted that, while general lithology can be identified using the projection of the respective P wave components on the first eigenvector, more specific lithology can be identified using the projection of the respective P wave component on the second eigenvector. It is further noted that the database could be any dimension, up to the n-dimensional space, based on the n samples of the wave component.

It is noted that any combination of wave components and/or eigenvectors may be employed in establishing the database. For example, the same wave component may be employed with its projections on different eigenvectors (as discussed above), different wave components may be employed with their respective projections on the same eigenvector, or different wave components may be employed with their respective projections on different eigenvectors.

In still another embodiment of the present invention, data compression can be accomplished using the eigenvectors as calculated above. Recalling that Karhunen-Loeve rotates the n-dimensional coordinate system to a new coordinate system, the wave component vectors can substantially be expressed in terms of their primary eigenvectors. For example, if the 4th through 50th eigenvalues are substantially equal to zero, each wave component vector can substantially be described using only their projection on the first three eigenvectors.

Assuming the wave component vectors can substantially be described using the first three eigenvectors, reconstruction factors $A_1$, $A_2$ and $A_3$ are defined as follows:

$$A_j = E_1^T S_j$$

$$B_j = E_2^T S_j$$

$$C_j = E_3^T S_j$$

where
$A_j$ represents a scalar reconstruction factor for the 1st eigenvector, jth waveform;
$B_j$ represents a scalar reconstruction factor for the 2nd eigenvector, jth waveform;
$C_j$ represents a scalar reconstruction factor for the 3rd eigenvector, jth waveform;
$E_i^T$ represents the transpose of the ith eigenvector; and
$S_j$ represents the jth wave component vector.

It is noted that $A_j$, $B_j$ and $C_j$ are the vectors obtained from correlating the first, second and third eigenvector to the individual wave components, respectively, i.e., the vector obtained from the individual aj's, bj's and cj's calculated as set forth at steps 306, 308 and 310, respectively.

The three scalar reconstruction factors are retained for each wave component vector, as well as the three eigenvectors. For illustrative purposes, assume each wave component vector has 50 samples and the data set has 10,000 waveforms. Without compression, the data set would require 1500k values for storage (50 samples per wave component * 3 wave components per waveform * 10k waveforms). By the data compression method herein described, only 90.45k values are required (3 wave components per waveform * 3 reconstruction factors per wave component * 10k waveforms+3 wave components per waveform * 3 eigenvectors per wave component * 50 samples per eigenvector). The compression ratio of the present invention is thus about 17 to 1.

In order to reconstruct the original wave components, the following equation is preferably employed:

$$S_j = A_j E_1 + B_j E_2 + C_j E_3 \text{ for } j=1 \text{ to } m$$

The above techniques have been described in detail with reference to sonic data acquired with one transmitter and one receiver. These techniques are also applicable to sonic data acquired by an array sonic tool, having at least one transmitter and a plurality of receivers, as well as a borehole compensation tool, having at least two transmitters and at least two receivers. Such tool configurations are well known and need not be described in detail herein.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What I claim as my invention is:

1. A method of compressing acquired sonic data, the sonic data comprising a data set of m waveforms, each of the waveforms including a formation wave component digitized into n samples, said method comprising the steps of:
   characterizing the n samples of each digitized formation wave component as a vector;
   obtaining a first eigenvector based on said formation wave component vectors;
   selecting a formation wave component;
   correlating said selected wave component to said first eigenvector, thereby obtaining a first scalar correlation factor; and
   retaining said first eigenvector and said first scalar correlation factor as a representation of said selected formation wave component in lieu of digitized formation wave component samples for said selected formation wave component, thereby compressing said acquired sonic data.

2. The method of claim 1, said method further reconstructing said compressed sonic data, said method further comprising the step of:
   multiplying said first eigenvector by said first scalar correlation factor, thereby substantially reconstructing said selected formation wave component.

3. A method of claim 1, said method further comprising the steps of:
   obtaining a second eigenvector based on said formation wave component vectors;
   correlating said selected wave component to said second eigenvector, thereby obtaining a second scalar correlation factor; and
   further retaining said second eigenvector and said second scalar correlation factor, said second eigenvector and said second scalar correlation factor further comprising said representation of said selected formation wave component.

4. The method of claim 3, said method further reconstructing said compressed sonic data, said method further comprising the steps of:
   multiplying said first eigenvector by said first scalar correlation factor, thereby obtaining a first reconstructed wave component;
   multiplying said second eigenvector by said second scalar correlation factor, thereby obtaining a second reconstructed wave component; and
   adding said first and second reconstructed wave components together, thereby substantially reconstructing said selected formation wave component.

5. The method of claim 3, said method further comprising the steps of:
   obtaining at least one additional eigenvector based on said formation wave component vectors;
   correlating said selected wave component to said at least one additional eigenvector, thereby obtaining at least one additional scalar correlation factor;
   further retaining said at least one additional eigenvector and said at least one additional correlation factor, said at least one additional eigenvector and said at least one additional correlation factor further comprising said representation of said selected formation wave component.

6. The method of claim 5, said method further reconstructing said compressed sonic data, said method further comprising the steps of:
   multiplying said first eigenvector by said first scalar correlation factor, thereby obtaining a first reconstructed wave component;
   multiplying said second eigenvector by said second scalar correlation factor, thereby obtaining a second reconstructed wave component;
   multiplying said at least one additional eigenvector by said at least one additional scalar correlation factor, thereby obtaining at least one additional reconstructed wave component; and
   adding said first, second and at least one additional reconstructed wave components together, thereby substantially reconstructing said selected formation wave component.

7. A method of compressing acquired sonic data, the sonic data comprising a data set of m waveforms, each of the waveforms including a formation wave component digitized into n samples, said method comprising the steps of:
   obtaining a first template of the formation wave components, said first template representing an average value of the formation wave components;
   selecting a formation wave component;
   correlating said selected wave component to said first template, thereby obtaining a first scalar correlation factor; and
   retaining said first template and said first scalar correlation factor as a representation of said selected formation wave component in lieu of digitized formation wave component samples for said selected formation wave component, thereby compressing said acquired sonic data.

8. The method of claim 7, said method further reconstructing said compressed sonic data, said method further comprising the step of:
   multiplying said first template by said first scalar correlation factor, thereby substantially reconstructing said selected formation wave component.

9. The method of claim 7, said method further comprising the steps of:
- obtaining a Hilbert transform of said first template, thereby obtaining a Hilbert template;
- correlating said selected wave component to said Hilbert template, thereby obtaining a second scalar correlation factor; and
- further retaining said Hilbert template and said second scalar correlation factor, said Hilbert template and said second scalar correlation factor further comprising said representation of said selected formation wave component.

10. The method of claim 9, said method further reconstructing said compressed sonic data, said method further comprising the steps of:
- multiplying said first template by said first scalar correlation factor, thereby obtaining a first reconstructed wave component;
- multiplying said Hilbert template by said second scalar correlation factor, thereby obtaining a second reconstructed wave component; and
- adding said first and second reconstructed wave components together, thereby substantially reconstructing said selected formation wave component.

11. A method of compressing acquired sonic data, the sonic data comprising a data set of m waveforms, each of the waveforms including a formation wave component digitized into n samples, said method comprising the steps of:
- obtaining a first template of the formation wave components, said first template representing an average value of the formation wave components;
- normalizing said first template;
- selecting a formation wave component;
- correlating said selected wave component to said normalized template, thereby obtaining a first scalar correlation factor; and
- retaining said normalized template and said first scalar correlation factor as a representation of said selected formation wave component in lieu of digitized formation wave component samples for said selected formation wave component, thereby compressing said said acquired sonic data.

12. The method of claim 11, said method further reconstructing said compressed sonic data, said method further comprising the step of:
- multiplying said normalized template by said first scalar correlation factor, thereby substantially reconstructing said selected formation wave component.

13. The method of claim 11, said method further comprising the steps of:
- obtaining a Hilbert transform of said normalized template, thereby obtaining a Hilbert template;
- correlating said selected wave component to said Hilbert template, thereby obtaining a second scalar correlation factor; and
- further retaining said Hilbert template and said second scalar correlation factor, said Hilbert template and said second scalar correlation factor further comprising said representation of said selected formation wave component.

14. The method of claim 13, said method further reconstructing said compressed sonic data, said method further comprising the steps of:
- multiplying said normalized template by said first scalar correlation factor, thereby obtaining a first reconstructed wave component;
- multiplying said Hilbert template by said second scalar correlation factor, thereby obtaining a second reconstructed wave component; and
- adding said first and second reconstructed wave components together, thereby substantially reconstructing said selected formation wave component.

* * * * *